Figure 1:
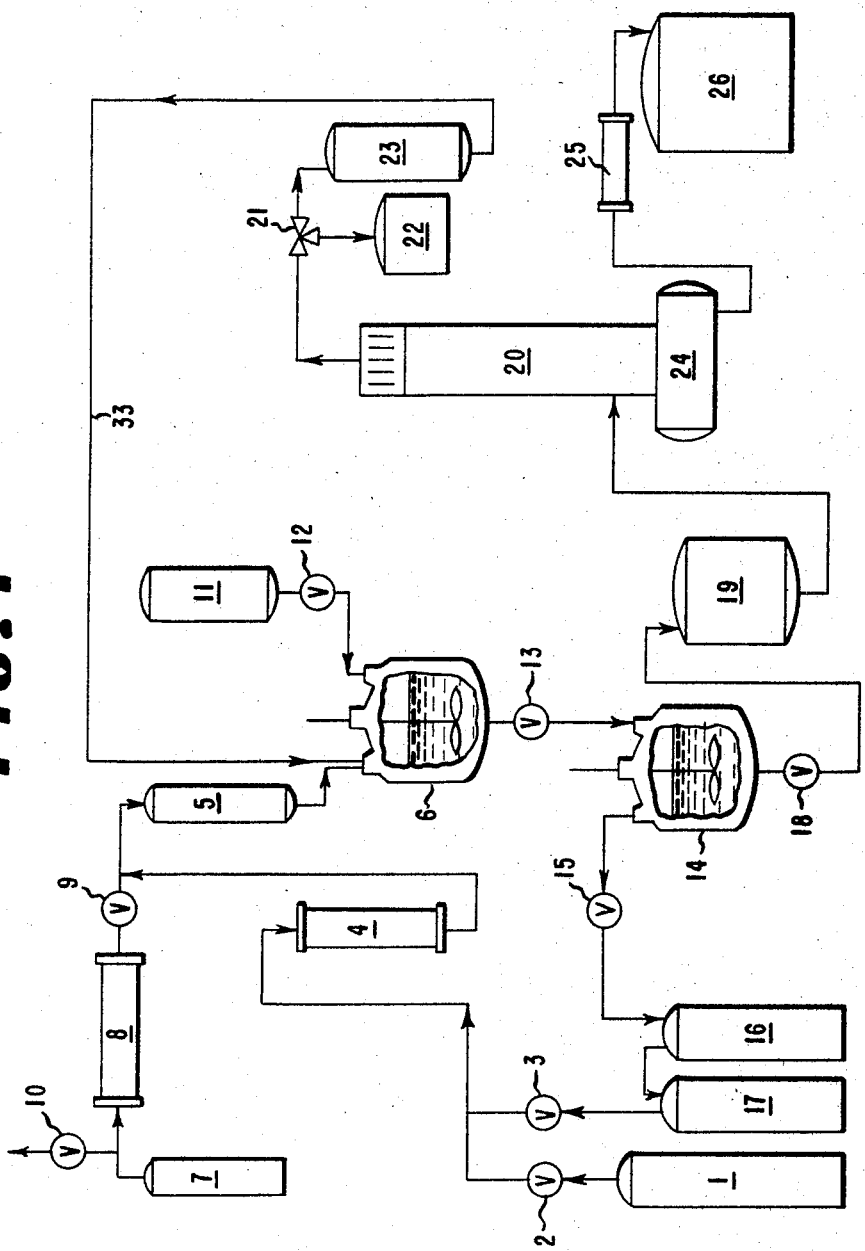

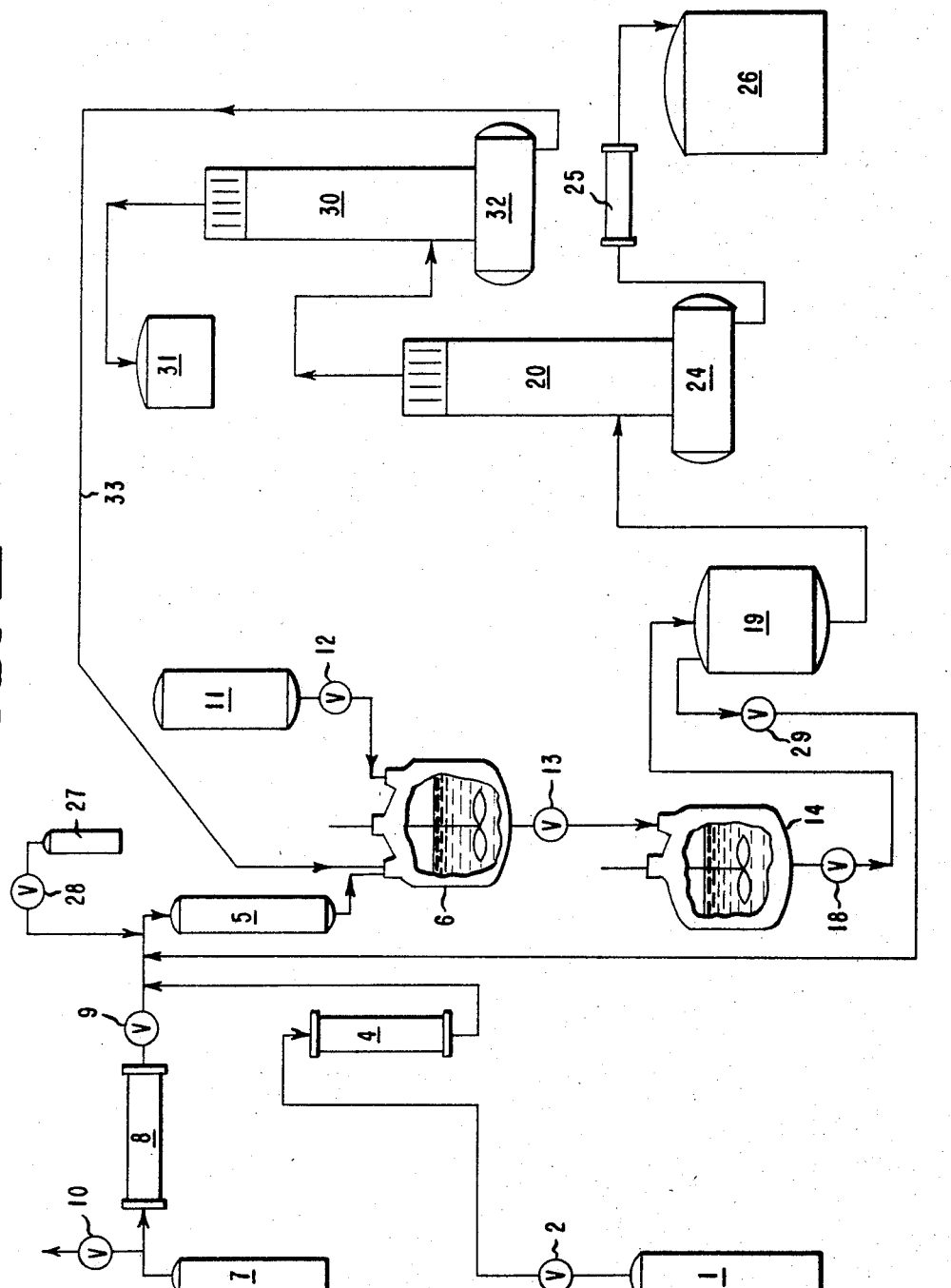

FIG. III
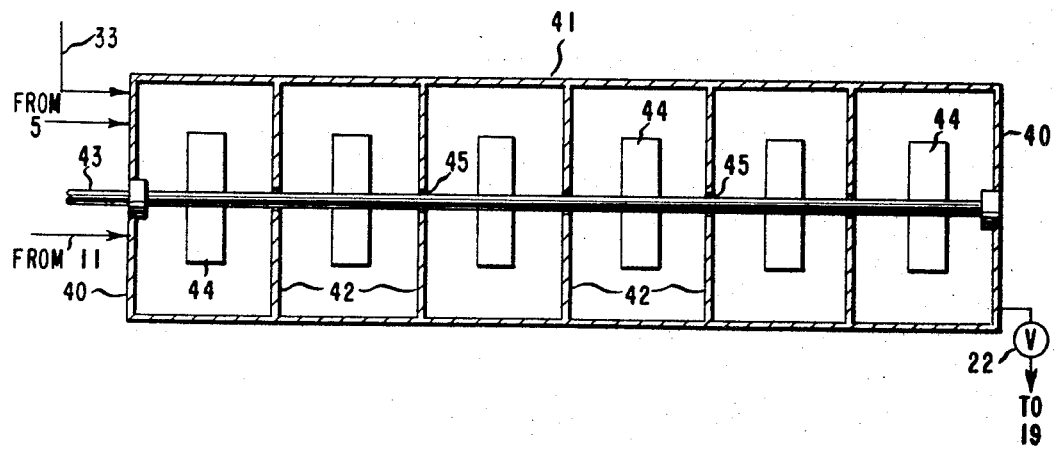

United States Patent Office 3,412,148
Patented Nov. 19, 1968

3,412,148
POLYMERIZATION OF HEXAFLUORO-
PROPYLENE OXIDE
Frederick Lowell Arbogast, Richmond, Va., assignor to
E. I. du Pont de Nemours and Company, Wilmington,
Del., a corporation of Delaware
Filed May 2, 1966, Ser. No. 546,682
7 Claims. (Cl. 260—544)

This invention relates to the polymerization of hexafluoropropylene oxide, and more particularly to a process for polymerizing hexafluoropropylene oxide to polymers having an average molecular weight of at least about 5500.

Moore, in Canadian Patent No. 725,740, issued Jan. 11, 1966, discloses the polymerization of hexafluoropropylene-1,2-epoxide, hereinafter referred to as hexafluoropropylene oxide, to polymers of the structure

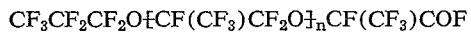
$$CF_3CF_2CF_2O[CF(CF_3)CF_2O]_nCF(CF_3)COF$$

where $n$ indicates the degree of polymerization, by contacting the monomer with a catalyst/diluent system at $-80°$ to $50°$ C. The catalyst system is usually a monovalent metal fluoride dispersed in a diluent. Alkali metal fluorides are most commonly used as the catalyst. A number of diluents are disclosed but dimethyl ethers of either ethylene glycol or polyethylene glycol are particularly advantageous due to the relatively high solubility of the catalyst in them.

Fluorinated polymers of the above structure are useful as intermediates for preparing perfluorinated polyethers of the structure $CF_3CF_2CF_2O[CF(CF_3)CF_2O]_nCF_2CF_3$, as described in British Patent No. 1,000,802, published Aug. 11, 1965. When these perfluorinated polyethers have a number average molecular weight of at least about 5500, as determined by the spectroscopic method, they are very useful as high temperature lubricating oils. However, using the batch polymerization process described in the Canadian patent, it is not possible to produce any substantial amount of polymer having an average molecular weight as high as 5500. Accordingly, there is a need for an improved process for producing these high molecular weight polymers.

It is an object of this invention to provide an improved process for the polymerization of hexafluoropropylene oxide to polymers having an average molecular weight of at least about 5500. Other objects will become apparent from the following description of this invention.

It has now been discovered that polymers of hexafluoropropylene oxide having an average molecular weight of at least about 5500 can be produced continuously in relatively high yield by the process which comprises (a) Maintaining a plurality of reaction zones wherein not more than about 67% of the total reaction volume is in the first reaction zone, (b) Continuously charging hexafluoropropylene oxide and an alkali metal fluoride liquid catalyst composition to the first reaction zone at the rate of about 75 to 225 moles of hexafluoropropylene oxide per mole of alkali metal fluoride, said liquid catalyst composition being prepared by mixing an alkali metal fluoride with at least about an equal weight of an ethylene glycol dimethyl ether of the formula, $CH_3O(CH_2CH_2O)_nCH_3$, wherein $n$ is 1 to 4, and reacting the alkali metal fluoride with about 2 to 3 moles of hexafluoropropylene oxide per mole of alkali metal fluoride, (c) Passing the reaction mass sequentially through the plurality of reaction zones while maintaining the reaction mass under agitation at a temperature of about $-45°$ to $-10°$ C. until at least about 85% of the hexafluoropropylene oxide has been converted to polymer, and (d) Continuously withdrawing crude reaction product from the final reaction zone and separating a polymer fraction having an average molecular weight of at least about 5500 as a product of the process.

FIGURE I schematically illustrates a process for continuously polymerizing hexafluoropropylene oxide in the absence of solvent using batch distillation of the product. FIGURE II illustrates a process for continuously polymerizing hexafluoropropylene oxide in the presence of solvent using continuous distillation of the product. FIGURE III schematically illustrates a reactor containing a plurality of reaction zones for use in the process of FIGURES I or II.

One of the essential features of the present invention is the use of a plurality of reaction zones. The exact number of reaction zones is not critical provided there are at least 2 and not more than 67% of the total reaction volume is in the first reaction zone. In other words, if there are only two reaction zones, the second zone must have at least one-half of the volume of the first. Preferably the first reaction zone has no more than about 50% of the total reaction volume. There is no upper limit on the number of reaction zones except as dictated by practical considerations.

Referring now to FIGURE I, gaseous hexafluoropropylene oxide from storage tank 1 passes through control valve 2 and is combined with any recycle hexafluoropropylene oxide entering through control valve 3. The combined flow passes through drying tower 4 containing a drying agent such as a molecular sieve. The dry hexafluoropropylene oxide is condensed in condenser 5 and then enters the first reactor 6. Since the polymerization reaction produces heat which must be removed, it is preferable that condenser 5 cool the hexafluoropropylene oxide to a temperature slightly below the desired reaction temperature.

In a solvent-free system the temperature in reactor 6 should be maintained in the range of about $-40°$ to $-30°$ C. and preferably about $-33°$ to $-37°$ C. Any needed pressure is supplied by nitrogen passing from storage tank 7 through driver 8 and control valve 9. Valve 10 is a pressure relief valve.

The maximum rate at which hexafluoropropylene oxide may be charged to reactor 6 is determined to some extent by the ability of the reactor to remove exothermic heat of reaction at a sufficient rate to maintain the temperature within the desired range. The feed range is more importantly determined, however, by the critical residence time necessary to produce the desired result. The hexafluoropropylene oxide feed rate in a solvent-free, two reactor system as illustrated in FIGURE I may vary from about 0.2 to 0.4 pound per hour per gallon of total reactor volume in both reactors 6 and 14.

If feed rates very much less than about 0.2 pound per gallon of total reactor volume are used, considerable polymer of higher molecular weight than desired is produced. For use as high temperature lubricating oils, the polymers should have an everage molecular weight of at least about 5500 and a pour point not in excess of about 50° F. as determined by Federal Test Method Standard 791, method 351. Preferably the polymer has an evarage molecular weight of about 5500 to 7000 although higher molecular weight polymers can be used for the production of greases. If feed rates in excess of about 0.4 pound per hour per gallon are used, or if reaction temperature exceeds about $-30°$ C., little if any product of average molecular weight as high as 5500 will be produced.

Liquid catalyst composition is prepared by combining dry alkali metal fluoride with at least about 1 and preferably about 1.25 to 1.75 volumes of dry diluent. The fluoride of lithium, sodium, potassium, ribidium or cesium may be used; cesium fluoride is particularly effective. Suitable diluents for the catalyst composition include ethylene glycol dimethyl ethers of the formula, $CH_3O(CH_2CH_2)_nCH_3$, where $n$ is 1 to 4. Although tetraethylene glycol dimethyl ether is preferred, the dimethyl ethers of ethylene glycol, diethylene glycol and triethylene glycol may also be used. After vigorously agitating the catalyst and diluent for about five minutes, the container is evacuated and hexafluoropropylene oxide is added, maintaining the temperature at 30° to 35° C., until about 2 to 3 moles of oxide per mole of fluoride have been added. Preferably, about 2.3 to 2.7 moles of oxide are added per mole of fluoride. The resulting catalyst composition is a stable usually homogeneous liquid mass.

The catalyst composition is transferred to catalyst storage tank 11. Liquid catalyst composition passes from tank 11 through valve 12 into reaction vessel 6. The amount of catalyst used is about 1 mole per 75 to 225 moles of hexafluoropropylene oxide. The preferred catalyst feed rate is about one mole of cesium fluoride per 125 to 175 moles of hexafluoropropylene oxide.

Polymerization mass is withdrawn from reactor 6 and pumped via control valve 13 to reaction vessel 14 which is maintained at a temperature of —40° to —30° C. Vessel 14 may be essentially like vessel 6 except that it should have agitation means which are more efficient for viscous liquids since the polymerization mass becomes highly viscous. Preferably the volume of the reaction mass in reactor 14 is substantially the same as that in reactor 6. As any pressure due to unreacted oxide builds up in reactor 14, the vaporous oxide is removed and pumped through control valve 15, surge tank 16, purification tower 17 and control valve 3. Tower 17 contains molecular sieve for removing undesired gaseous by-products of the polymerization.

Crude product is continuously withdrawn from reactor 14 and pumped via control valve 18 into hold tank 19. When sufficient product has collected in tank 19, it is pumped into still 20 where the crude product is batch distilled. The first fraction, comprising primarily the catalyst diluent, is passed to recovery tank 22 via valve 21. The second fraction, comprising primarily polymer having an average molecular weight lower than desired, is passed into hold tank 23 from which it is pumped to reactor 6 via recycle line 33 or to a recovery tank, as desired. The desired high molecular weight polymer collects in reboiler 24 is eventually pumped through filters 25, which removes the solid catalyst, and into product recovery tank 26.

Although the kinetics of the present polymerization indicate that the alkali metal fluoride is a reactant, it is reformed in the termination step of the polymerization. Thus, all of the catalyst entering reactor 6 from storage tank 11 eventually is collected in filter 25 from which it may be recovered for reuse, if desired.

Under the preferred conditions for the process illustrated in FIGURE I, the hold time in both reactors totals about 8 to 10 hours, conversion of hexafluoropropylene oxide is at least about 85% and about 20% by weight of the product is useful polymer having an average molecular weight of 5500 or higher.

To start up this reaction system, gaseous hexafluoropropylene oxide is condensed in condenser 5 and passed into reactor 6 until about 40 to 60% of the desired reaction mass for reactor 6 is charged. Then small amounts of liquid catalyst composition are added from catalyst storage tank 11 until initiation of the polymerization reaction is indicated by a temperature increase. The liquid hexafluoropropylene oxide and catalyst composition are added continuously at the rate desired for sustained operation. When the desired reaction volume in reactor 6 is achieved, control valve 13 is opened and reaction mass is continuously withdrawn and passed into reactor 14. Nitrogen pressure from storage tank 7 may be applied, if necessary, to cause the product to flow. When the liquid level in reactor 14 reaches the desired reaction volume, valve 18 is activated by a level sensing means and product is continuously passed to hold tank 19.

As indicated earlier, the polymerization mass becomes increasingly viscous until a high viscosity is reached. This high viscosity seems to inhibit the formation of greater amounts of the desired high molecular weight polymer. However, this situation can be improved by the use of a solvent. Either dichlorodifluoromethane or hexafluoropropylene are effective, the latter being preferred. When using a solvent, the system can be modified as shown in FIGURE II.

Referring now to FIGURE II, solvent from storage tank 27 is passed through valve 28 into the monomer feed line. Both solvent and monomer are condensed in condenser 5 and pass into vessel 6. In this embodiment, hexafluoropropylene oxide is fed at the rate of about 0.4 to 1.0 pound per hour per gallon of total reactor volume, about 0.8 to 1.0 pound per hour per gallon being preferred. The solvent may be charged at the rate of about 1 to 50% by weight of the total charge, and preferably about 10 to 20%. Catalyst feed rates are the same as in the solvent-free process, the preferred rate being about one mole of alkali metal fluoride per 125 to 175 moles of the monomer. The permissible polymerization temperature range changes to about —45° C. to —10° C., the preferred temperature being about —30° C. to —20° C.

Under the preferred conditions for the solvent system, the conversion of hexafluoropropylene oxide polymers is usually greater than about 95% and the conversion to polymer having an average molecular weight of at least about 5500 is increased to about 75%, as compared to the 20% obtained in the solvent-free system. Surprisingly, the use of solvent also allows higher feed rates.

When product from second reaction vessel 14 enters hold tank 19 it is cold. As the mass becomes warmer due to the effect of ambient temperature, solvent and any unreacted hexafluoropropylene oxide evaporate and pass through valve 29 back to condenser 5. Liquid product is pumped from tank 19 into still 20 as before.

As taught in U.S. Patent No. 2,918,501, hexafluoropropylene solvent will dimerize or trimerize under the proper conditions in the presence of alkali metal fluoride and tetraethylene glycol ether. This will occur in the present system if the reaction temperature is too high. These dimers do not evaporate in tank 19 but instead pass into still 20. During distillation any hexafluoropropylene dimers or trimers present are removed in the first fraction along with the tetraethylene glycol ether. Dichlorodifluoromethane, if used, is unaffected and always evaporates in tank 19 for recycle.

A continuous distillation system is illustrated in FIGURE II although the batch distillation system illustrated in FIGURE I could be used, if desired. Product from hold tank 19 is pumped into still 20 wherein the desired high molecular weight polymer product is collected in reboiler 24 and then treated as before. The distillate from still 20 comprising catalyst diluent and low molecular weight polymer passes into still 30 where the catalyst diluent distills overhead and is collected in hold tank 31 while the low molecular weight polymer collects in reboiler 32 from which it is pumped to reactor 6 via recycle line 33. Continuous distillation is particularly useful for large scale production; for small scale production the batch system illustrated in FIGURE I is easier to operate.

The purification train shown is particularly suited for the manufacture of polymer having an average molecular weight of at least 5500 which is to be further fluorinated, as earlier described. For this use the ethylene glycol ether must be completely removed due to its reactivity with fluorine. If the polymer is to be used for other purposes, separation from the glycol ether may not be necessary. As indicated earlier, when low molecular weight polymer is wanted, distillation is also not necessary.

The reaction temperatures used are usually lower than the boiling points of the reactants at one atmosphere, hence little internal pressure is involved in the system. If desired, condenser 5 of FIGURES I and II can be omitted, thereby causing the monomer and any solvent present to condense directly in reactor 6. As noted earlier, temperature control can be a problem, hence condenser 5 is desirable since it takes the heat load imposed by condensation of hexafluoropropylene oxide and solvent away from reactor 6. Omission of condenser 5 accordingly requires design of reactor 6 with additional heat transfer capacity such as internal cooling coils as well as external cooling.

In FIGURES I and II reaction vessels 6 and 14 along with valves 13 and 18 may be replaced by a single multi-staged reactor. FIGURE III schematically illustrates a longitudinal cross section of such apparatus.

Referring now to the apparatus of FIGURE III, the vessel is steel and consists of two outer end walls 40 perpendicular to outer wall 41, a continuous tubular member joined to walls 40 to form a cylindrical volume. The apparatus contains five metal partitions 42 perpendicular to the axis of the vessel and dividing it into six essentially equal subvolumes, an agitation shaft 43, five agitator blades 44 attached to shaft 43 and an annular opening 45 between the shaft 43 and the partitions 42. Hexafluoropropylene oxide, and solvent if used, from condenser 5, recycle via line 33 and catalyst from tank 11 enter via the indicated lines. Product leaves via valve 22 to hold tank 19, as indicated. The vessel is mounted preferably horizontally.

The distance between the various partitions 42 and between the two end partitions 42 and walls 40 preferably should be essentially equal and such that the ratio of this distance to the square root of the cross-sectional area circumscribed by wall 41 is from 0.5 to 3.0.

In a particular embodiment of the apparatus illustrated in FIGURE III, the vessel is a 2.44 gallon (9.24 liter) cylinder of 5.8 inches (14.5 cm.) internal diameter and 21.6 inches (54.9 cm.) length, having five equally spaced partitions 3.6 inches (9.1 cm.) apart, giving six sub-volumes of 93.9 cu. in. (1.540 liters) each. The ratio of the length of each subvolume to the square root of cross-sectional area is 0.705. The area of each annular opening 45 is 0.065 in.$^2$ (0.416 cm.$^2$). The agitation shaft 43 with blades 44 is of the turbine type, operating at between 200 and 1000 r.p.m.

The permissible feed rates for this system are the same as for the two reactor systems shown in FIGURES I and II, that is, 0.2 to 0.4 pound per hour per gallon of total reactor volume without solvent and 0.4 to 1.0 pound per hour per gallon with solvent.

The following examples, illustrating the novel process disclosed herein, are given without any intention that the invention be limited thereto.

EXAMPLE 1

This example is carried out in a reactor system similar to that illustrated in FIGURE I. The reactors are each agitated, 10-gallon autoclave type vessels provided with cooling jackets through which a cooling medium is circulated to control the reaction temperature. To start up the system, gaseous hexafluoropropylene oxide is condensed at −40° C. and passed into the first reactor, which is also at −40° C., until the latter is approximately 50% full of liquid.

Liquid catalyst composition is prepared by combining dry cesium fluoride with 1.5 volumes of dry tetraethylene glycol dimethyl ether. After agitating the cesium fluoride and solvent vigorously for five minutes, the container is evacuated and the vacuum broken with hexafluoropropylene oxide. Additional oxide is added, maintaining the temperature at 30° to 35° C. until 2.5 moles of oxide per mole of fluoride have been added.

Small amounts of liquid catalyst composition are added to the first reactor until the polymerization reaction initiates as indicated by a temperature increase. Then liquid hexafluoropropylene oxide is added continuously at the rate of about 8 lbs. per hr. Liquid catalyst is continuously added to the reactor at the rate of one mole of cesium fluoride per 150 moles of hexafluoropropylene oxide. When the reactor is approximately 75% full of liquid, the polymerization mass is slowly pumped to the second reactor which is also maintained at −40° C.

The second reactor differs from the first only in being provided with agitation means which are more efficient for viscous liquids. The polymerizing mixture remains in the second reactor until hexafluoropropylene oxide conversion to polymer is 85% complete.

When the liquid level reaches about 75% full, crude product polymer is pumped into the hold tank. The hold time in both reactors is 9 hours. When sufficient product has collected in the hold tank it is pumped into the still where the crude product is batch distilled. The first fraction, boiling up to 150° C. at 1 mm. Hg and comprising primarily the dimethyl ether of tetraethylene glycol, is passed to the recovery tank. The second fraction, boiling up to 310° C. at 1 mm. Hg and comprising primarily low molecular weight polymer of average molecular weight less than 6,000, is passed into the hold tank.

The desired high molecular weight polymer that collects in the reboiler is eventually pumped through the filter which removes the solid cesium fluoride, and into the product collection tank. Polymer having a number average molecular weight of 6,000 is produced at the rate of 1.4 lbs. per hr.

EXAMPLE 2

Example 1 is repeated except that the process is modified as required to accommodate the use of hexafluoropropylene as solvent. In starting up the system hexafluoropropylene solvent is charged at the rate of 15% by weight of the total charge. After initiation of the polymerization reaction hexafluoropropylene oxide is charged at the rate of 18 lbs. per hr. and hexafluoropropylene solvent is charged at the rate of 3.2 lbs. per hr. Both reactors are maintained at 25° C. Conversion of hexafluoropropylene oxide to polymer in the second reactor is 95%. Polymer having a number average molecular weight of 6,000 is produced at the rate of 11.4 lbs. per hr.

Although the invention has been described and exemplified by way of specific embodiments, it is to be understood that it is not limited thereto. As will be apparent to those skilled in the art, numerous modifications and variations of these embodiments may be made without departing from the spirit of the invention or the scope of the following claims.

The embodiments of the invention in which an exclusive property or privilege is claimed are defined as follows:

1. A process for the polymerization of hexafluoropropylene oxide to polymers having an average molecular weight of at least 5500 which comprises
  (a) maintaining a plurality of reaction zones wherein not more than 67% of the total reaction volume is in the first reactor zone,
  (b) continuously charging hexafluoropropylene oxide and an alkali metal fluoride liquid catalyst composition to the first reaction zone at the rate of 75 to 225 moles of hexafluoropropylene oxide per mole of alkali metal fluoride, said liquid catalyst composition being prepared by
    (1) mixing an alkali metal fluoride with at least an equal weight of an ethylene glycol dimethyl ether of the formula, $CH_3O(CH_2CH_2O)_nCH_3$, wherein $n$ is 1 to 4, and
    (2) reacting the alkali metal fluoride with 2 to 3 moles of hexafluoropropylene oxide per mole of alkali metal fluoride,
  (c) passing the reaction mass sequentially through the plurality of reaction zones while maintaining the reaction mass under agitation at a temperature of −45° to −10° C. until at least 85% of the hexafluoropropylene oxide has been converted to polymer, and (d) continuously withdrawing crude reaction product from the final reaction zone and separating a polymer fraction having an average molecular weight of at least 5500 as a product of the process.

2. The process of claim 1 in which no solvent for the hexafluoropropylene oxide is present, hexafluoropropylene oxide is continuously charged at the rate of 0.2 to 0.4 pound per hour per gallon of total reactor volume, the alkali metal fluoride is cesium fluoride, and the temperature is maintained at −40° to −30° C.

3. The process of claim 2 in which the hexafluoropropylene oxide is charged at the rate of 0.35 to 0.4 pound per hour per gallon of total reactor volume, the catalyst composition is charged at the rate of one mole of cesium fluoride per 125 to 175 moles of hexafluoropropylene oxide, and the temperature is maintained at −33° to −37° C.

4. The process of claim 2 in which the reaction is started up by charging hexafluoropropylene oxide to the first reaction zone until 40 to 60% of the reaction mass desired in the first reaction zone has been charged, adding catalyst composition until polymerization initiates and establishing static conditions throughout the process.

5. The process of claim 1 in which a solvent selected from the group consisting of hexafluoropropylene and dichlorodifluoromethane is present, hexafluoropropylene oxide is continuously charged at the rate of 0.4 to 1.0 pound per hour per gallon of total reactor volume, said solvent is continuously charged to the first reaction zone at the rate of 1 to 50% by weight of the total charge, and the alkali metal fluoride is cesium fluoride.

6. The process of claim 5 in which the hexafluoropropylene oxide is charged at the rate of 0.8 to 1.0 pound per hour per gallon of total reactor volume, the solvent is hexafluoropropylene and is charged at the rate of 10 to 20% by weight of the total charge, the catalyst composition is charged at the rate of one mole per 125 to 175 moles of hexafluoropropylene oxide, and the temperature is maintained at −40° to −30° C.

7. The process of claim 5 in which the reaction is started up by charging hexafluoropropylene oxide and solvent to the first reaction zone until 40 to 60% of the reaction mass desired in the first reaction zone has been charged, charging solvent until the solvent content of the reaction mass is 10 to 50% by weight, maintaining the reaction mass at a temperature of −40° to −30° C., adding catalyst composition until polymerization initiates, and establishing static conditions throughout the process.

References Cited

UNITED STATES PATENTS 3,322,826 5/1967 Moore _____ 260—544
3,250,808 5/1966 Moore _____ 260—544

FOREIGN PATENTS 725,740 1/1966 Canada.

LORRAINE A. WEINBERGER, *Primary Examiner.*

J. H. NIELSEN, *Assistant Examiner.*